United States Patent Office 2,960,802
Patented Nov. 22, 1960

2,960,802
METHOD OF MAKING A SEMICRYSTALLINE CERAMIC BODY

Raymond O. Voss, Corning, N.Y., assignor to Corning Glass Works, Corning, N.Y., a corporation of New York No Drawing. Filed Nov. 12, 1958, Ser. No. 773,183

2 Claims. (Cl. 49—77)

This invention relates to the production of semicrystalline ceramic bodies by the controlled crystallization of glass bodies by heat treatment and particularly to a novel method of making a semicrystalline body, without substantially deforming it while providing it with a relatively high modulus of rupture, sometimes called flexural strength and a low thermal expansion coefficient, from a glass body comprising primarily $SiO_2$, $Li_2O$, $Al_2O_3$ and $TiO_2$, and optionally containing up to 5% of other compatible oxides, the $TiO_2$ functioning to promote crystallization.

Glass bodies having such compositions may be converted by suitable heat treatments to semicrystalline bodies which are characterized in general by higher moduli of rupture, higher deformation temperatures and lower linear thermal expansion coefficients than those of the original glass bodies, as is shown in the pending United States application of Stanley D. Stookey Serial No. 718,398 filed March 3, 1958. Substantial variations in composition and/or heat treatment cause substantial variations in the moduli of rupture, expansion coefficients and amount of deformation of the semicrystalline products and it is sometimes necessary to compromise and accept less than the optimum value of one or more properties in order to obtain a desired optimum value of another property. A heat treatment which will produce a body having the maximum modulus of rupture will cause a deformation of the body sufficient to make it unsuitable for purposes requiring a relatively small tolerance in dimensions or a close fit with other parts, such as for instance, sauce pans and skillets with their covers and auxiliary hardware (handles and mounting racks).

It is an object of this invention to provide a method whereby the above-mentioned difficulties can be overcome and a glass body having a composition in the above-mentioned range can be converted without substantial change of size and shape to a semicrystalline body having a relatively high modulus of rupture of at least 13,000 p.s.i. and a low linear thermal expansion coefficient, preferably not exceeding about $15 \times 10^{-7}$ per ° C. between 0° and 300° C.

Specifically the method comprises heat treating a glass body consisting essentially of about 71% $SiO_2$, 2.5% $Li_2O$, 18% $Al_2O_3$, 4.5% $TiO_2$, 3% MgO and 1% ZnO, plus minor constituents as explained below, by heating it at a rate of not over 5° C. per minute to about 800° C., holding it at about 800° C. for about 1 hour, further heating it at a rate not over 5° C. per minute to 1080°–1120° C. and holding it in such temperature range for about 4 hours. Preferably, the body is held for about 2 hours at about 1080° C. and for about 2 hours at about 1120° C.

The above-mentioned composition was melted in a continuous tank furnace at about 1600° C. In order to maintain oxidizing conditions in the tank during melting, small amounts of $NaNO_3$ and $As_2O_5$ were included in the batch as oxidizing agents, the $As_2O_5$ also functioning as a fining agent. Other conventional oxidizing and fining agents can be substituted, if desired. The residual $Na_2O$ and $As_2O_3$ remaining in the glass amount to about 1.5% of the total composition and have no appreciable effect on the properties of either the glass or its semicrystalline product. For convenience and facilitation of expression, therefore, the composition is expressed in round figures by omitting such minor constituents and rounding off the remaining constituents as is indicated above.

The modulus of rupture preferably is measured in the conventional manner by supporting individual rods of the semicrystalline product about ¼ inch in diameter and 4 inches long on 2 knife edges spaced 3½ inches apart and loading them on 2 downwardlly acting knife edges about ¾ inch apart and centrally spaced from the lower knife edges until breakage of the rods occurs. To ensure comparable results the rods are first abraded by being rolled in a ball mill for 15 minutes with 30 grit silicon carbide. Five or more rods are thus tested to obtain the average value which is calculated in p.s.i. Abraded rods of glass in general, when treated and measured in this manner show moduli of rupture ranging from 5000 to 6000 p.s.i.

The method of measuring the linear thermal expansion coefficients of glasses and semicrystalline ceramics is so well known as to require no discussion here. The measured expansion coefficient of the above-described composition in the vitreous state is about $34 \times 10^{-7}$ per ° C. between 0° and 300° C.

In comparison with the above values for the modulus of rupture and the expansion coefficient of the glass, the stated heat treatment of the above-described glass will produce semicrystalline bodies having an average modulus of rupture of at least 13,000 p.s.i. and an expansion coefficient of $10-15 \times 10^{-7}$ per ° C. between 0° and 300° C.

The amount of deformation which will be produced by a specific heat treatment schedule during conversion of a body of the above-described glass to a semicrystalline body is most readily measured by using rods of the glass ¼ inch in diameter and 5 inches long and subjecting them to said schedule while they are mounted on refractory supports spaced 4 inches apart. The deformation produced in the rods by and during the heat treatment is shown by the bow or sag of the rods and is defined in mils or mm. as the depth of the arc from the horizontal between the ends of the rods.

The use of a preliminary holding temperature or range is essential for the proper initiation of crystallization. It is believed that in such temperature range sub-microscopic crystallites or nuclei segregate throughout the glass and slowly increase in size with time and temperature and that such nuclei constitute the beginning of the formation of an interlocked crystalline structure or network of high melting point which ultimately will support the body and minimize its deformation as the temperature is further increased.

I have discovered that, in order to convert a body of said specific composition to a semicrystalline body of high modulus of rupture and low expansion coefficient without substantial deformation the preliminary holding temperature is approximately 800° C. I have also found that the most effective holding time for the present purpose is about 1 hour. Holding for a substantial time at a temperature substantially above or below 800° C. tends to lower the modulus of rupture and increase the deformation.

The conversion of the glass body to the desired semicrystalline state is far from complete at this stage and further heating at a higher temperature (1080°–1120° C.) is required. During such subsequent heat treatment I have found that the best results are obtained by holding the temperature for about 2 hours at 1080° C. followed by about 2 hours at 1120° C. It is difficult to hold, elevate and again hold with exactness the temperature of ware, such as pressed culinary ware, stacked on cars passing through a commercial type heating kiln. Failure to raise the temperature of the ware high enough or to hold it at the stated temperature tends to lower its modulus of rupture. On the other hand, if the temperature substantially exceeds 1120° C. for a substantial length of time the amount of deformation tends to increase objectionably. In the production of sauce pans and skillets which are to be provided with covers, a deformation not exceeding about 10 mm. has been found to give a satisfactory cover fit and adequate maintenance of overall contour.

The rate at which the temperature is raised up to the preliminary holding temperature and from there to the final holding range should preferably not exceed about 5° C. per minute. Slower rates increase the expense but otherwise are not objectionable. Cooling the semi-crystalline product too slowly (1°–2° C. per minute) tends to raise its expansion coefficient. A rate of 5° C. per minute is satisfactory and will not damage the refractory parts of the kiln. Higher cooling rates are also satisfactory but are limited only by the thermal shock resistance of the refractories. The method set forth above constitutes the best method for commercial use wherein the desired result is obtained in a minimum time with the lowest practical amount of overhead expense and fuel cost. In another application filed concurrently herewith, Serial No. 773,182 by Stanley D. Stookey and Charles B. King, there is described and claimed a method of heat treating a glass body to convert it to a semicrystalline body having an average modulus of rupture when abraded of at least 21,000 p.s.i. and an expansion coefficient of $10 \times 10^{-7}$ per ° C. or less between 0° and 300° C.

What is claimed is:

1. The method of heat treating a glass body consisting essentially of about 71% $SiO_2$, 2.5% $Li_2O$, 18% $Al_2O_3$, 4.5% $TiO_2$, 3% $MgO$ and 1% $ZnO$ by weight to convert it without substantial change of size and shape to a semicrystalline body having a modulus of rupture of at least 13,000 p.s.i. and a low linear thermal expansion coefficient, which comprises heating the glass body at a rate not over 5° C. per minute to about 800° C., holding it at such temperature for about 1 hour, further heating it at a rate of not over 5° C. per minute to 1080°–1120° C. and holding it in such temperature range for about 4 hours and cooling it at a rate of at least about 5° C. per minute.

2. The method of claim 1 in which the temperature of the body is held for about 2 hours at about 1080° C. and for about 2 hours at about 1120° C.

References Cited in the file of this patent

UNITED STATES PATENTS

| | | |
|---|---|---|
| 1,394,296 | Fisher | Oct. 18, 1921 |
| 1,893,382 | Watson | Jan. 3, 1933 |
| 2,691,855 | Armistead | Oct. 19, 1954 |